Sept. 23, 1952　　　　J. MORKOSKI　　　　2,611,228
BEET TOPPER

Filed June 23, 1949　　　　　　　　　2 SHEETS—SHEET 1

Inventor
James Morkoski
Paul O. Pippel
Atty

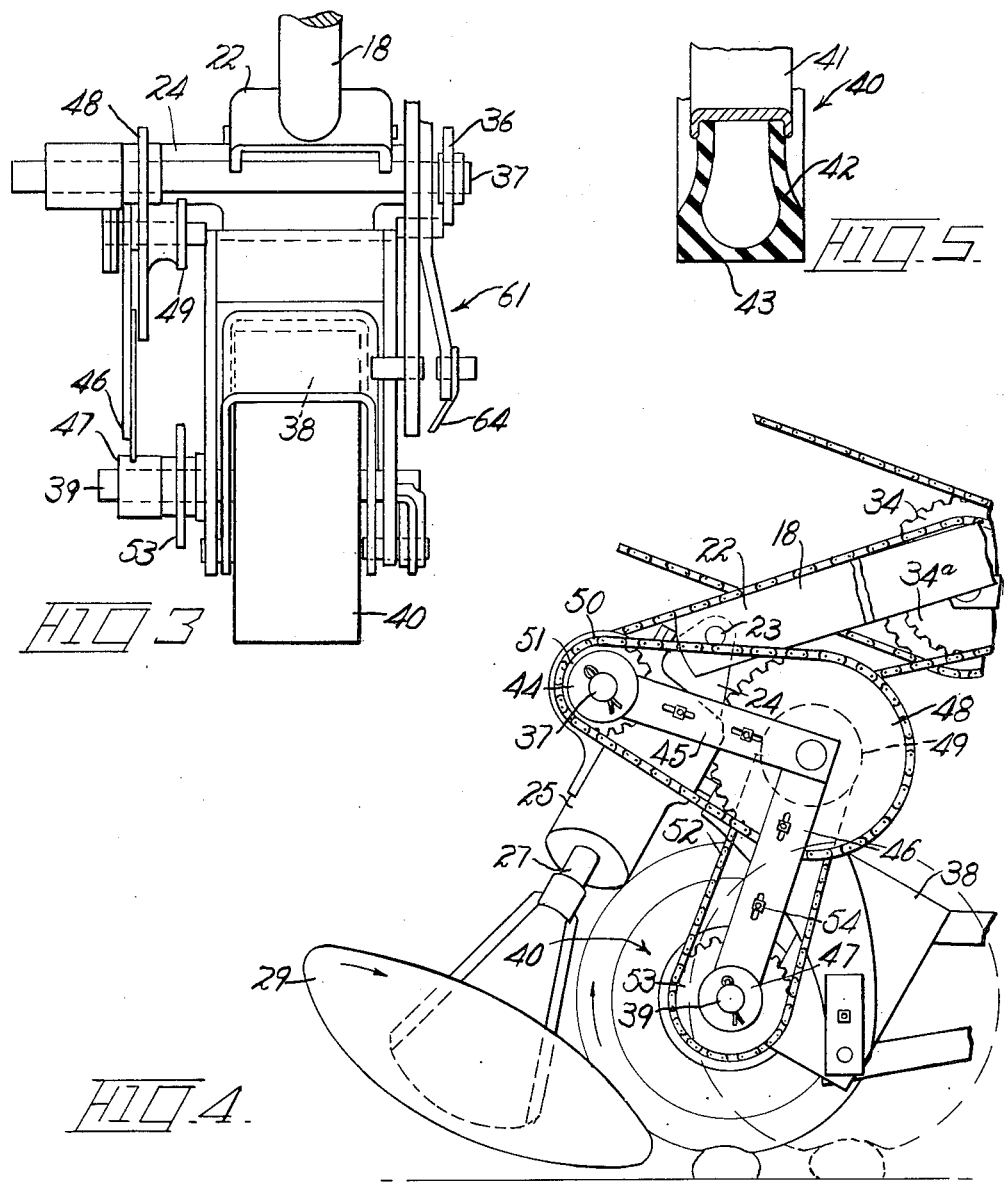

Patented Sept. 23, 1952

2,611,228

UNITED STATES PATENT OFFICE 2,611,228

BEET TOPPER

James Morkoski, Canton, Ill., assignor to International Harvester Company, a corporation of New Jersey Application June 23, 1949, Serial No. 100,820

6 Claims. (Cl. 56—121.46)

This invention relates to agricultural implements and particularly to harvesters for beets and the like. More specifically, the invention concerns an improved topping mechanism for removing the foliage and crown from the beet.

One of the major problems of sugar beet harvesting is the removal of the tops with a minimum loss of the sugar-containing portions of the beet. Conventional topping knives frequently split the beet, chip off valuable portions thereof, or otherwise injure the beet. Another important problem having a direct bearing upon the quality of top removal is the manner in which the position of the knife is to be gauged. Beets in a row vary considerably in size and in the extent to which they project above the ground. Therefore, it is customary in sugar beet harvesting to provide in combination with the topping knife a feeler gauge adapted to rise and fall and to cause the knife to rise and fall with the variations in height of the beets. This procedure has required that the topping unit be heavy enough to ride upon the beets and accurately gauge the amount of top to be severed. The weight of the topper has resulted in injury to the beets, and the frequent rise and fall thereof has subjected the unit to shocks tending to shorten its life and to lower its efficiency.

It is also important in beet topping that a differential relation be maintained between the size of beet and the amount of crown to be removed. In other words, less crown should be cut from a small beet than from a larger beet. This problem has been solved in conventional toppers by providing a differential movement between the finder or gauge and the cutting blade. This, of course, involved the construction of complicated mechanism to produce this differential action automatically, and thus added weight and expense to the topper.

It is an object of the present invention to overcome the foregoing disadvantages and to provide an improved topper for beets and the like.

Another object of the invention is to provide in a beet topper a novel gauge means adapted to regulate the amount of crown to be removed from the beet depending upon the size of the beet.

A further object of the invention is to provide in a beet topper improved cutting means for severing the tops from the beets.

With these and other objects in view the invention contemplates the provision of a pneumatic tired feeler for gauging the amount of crown to be removed from the beet by the topping knife. Such a feeler offers a number of advantages. For example, the conventional type of metal, runner-like gauge injured the foliage, and since the entire weight of the topping unit was borne by the beet, splitting of the beet during penetration by the knife often occurred. With the pneumatic tired wheel of the present invention the vertical movement of the topping unit as variations occur in height of the beets above the ground is reduced to a minimum as the pneumatic tire yields in proportion to the size of the beet. Thus a differential is observed in the thickness of crown cut from beets of different size without the need for the additional mechanism required to automatically change the spacing between knife and gauge found in conventional toppers.

Other objects and advantages will appear from the following detailed description when read in conjunction with the accompanying drawings wherein:

Figure 3 is an enlarged view in front elevation of the structure shown in Figure 1 with parts omitted for clarity;

Figure 4 is an enlarged view in side elevation of the beet topper; and

Figure 5 is a cross-section of a portion of the gauge wheel showing the construction of the pneumatic tire.

Figure 1:
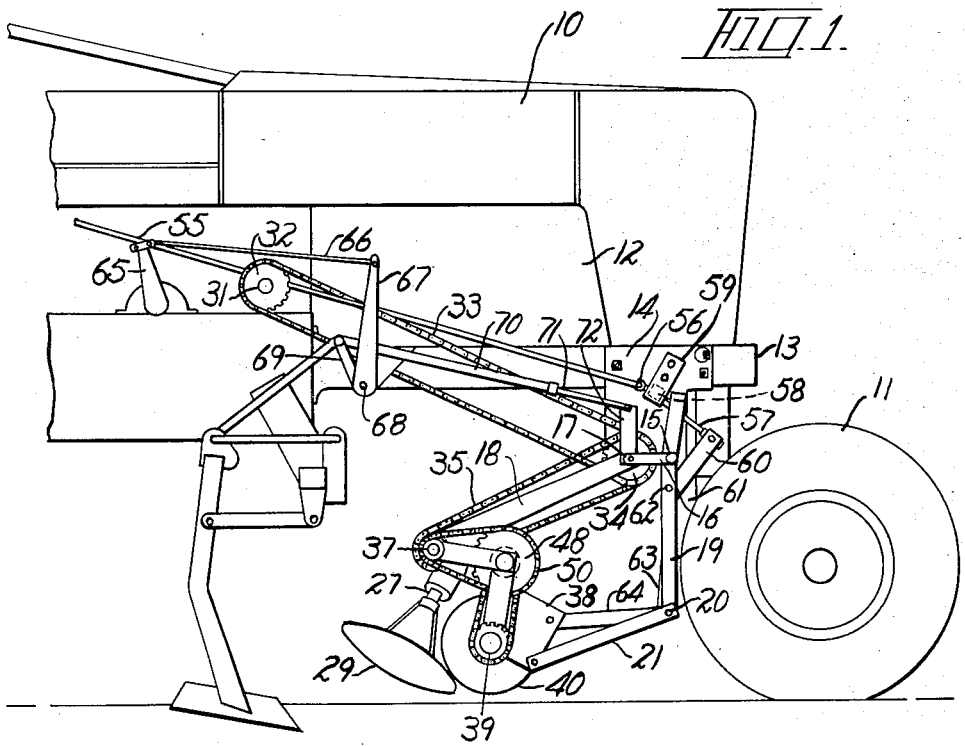
Figure 1 is a view in side elevation of the front portion of a tractor having a beet topper embodying the features of the present invention mounted thereupon.

Referring to the drawings, the tractor upon which the beet topper is mounted is designated by the numeral 10 and is provided with front wheels 11 and a power plant 12. The tractor is provided with a side sill 13 to which is secured a depending plate 14 having secured thereto and extending laterally therefrom a shaft 15 having a forwardly bent outer end 16 upon which is pivotally mounted a rock arm in the form of a yoke 17 having a rearwardly extending arm portion 18.

Figure 2:
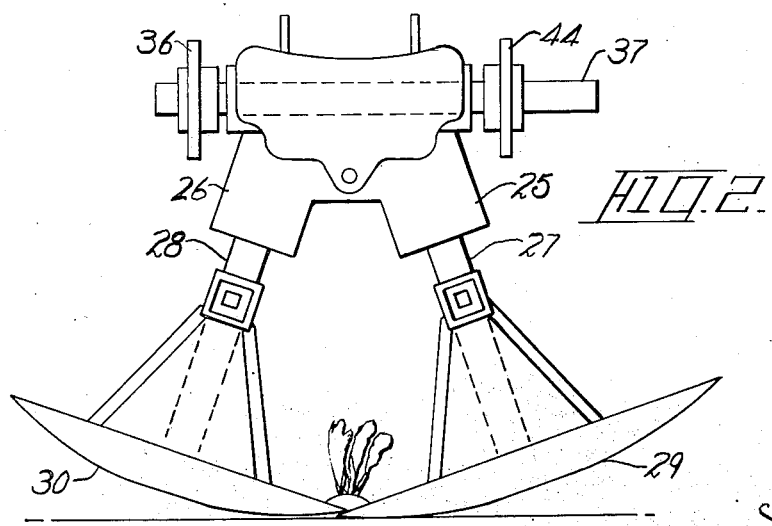
Figure 2 is an enlarged detail in rear elevation showing the topping disks.

Likewise secured to the shaft 15 is a depending bracket 19 provided at its lower end with a pivot pin 20 upon which is pivoted a rearwardly extending link 21 which forms with the link or arm 18 the lower of a pair of vertically spaced generally parallel links. The rearwardly extending end of link 18 is also provided with a yoke 22 which is pivotally mounted at 23 upon a casting 24. Formed as a part of casting 24 are bearings 25 and 26. As shown in Figure 2, these bearings diverge downwardly and, as indicated in Figures 1 and 4, are inclined rearwardly. Mounted for rotation in bearings 25 and 26 are, respectively, shafts 27 and 28 having secured to the lower end thereof for axial rotation therewith cutting disks 29 and 30. These disks are shallow and concave with their convex sides lowermost, and as shown in Figure 2 their inner edges overlap. The disks are so arranged and shaped that a relatively broad cutting edge is provided by the two disks, which edge is substantially parallel to the ground and substantially continuous.

The disks 29 and 30 are driven from the tractor power plant. A shaft 31 is driven from the tractor power plant through a power take-off shaft, not shown. Shaft 31 has mounted thereupon a sprocket 32 about which is trained a chain 33 also trained around a sprocket wheel 34 journaled upon the pivot of yoke 17. Secured to sprocket 34 is a sprocket 34ª drivingly connected by a chain 35 with a sprocket wheel 36 mounted upon a shaft 37 carried by the casting 24. Suitable gearing is provided in casting 24 for transmitting driving motion to rotate disk 29 in the direction of the arrow in Figure 4 and to rotate disk 30 in the opposite direction.

Also secured to the casting 24 is a hood-shaped supporting member 38 to which is pivotally connected the rear end of lower parallel link 21. A transversely extending axle 39 is provided upon which is journaled a rotary member in the form of a wheel 40. Wheel 40 comprises a rim portion 41 and a pneumatic tire 42. Tire 42, as shown in Figure 5, is so constructed as to provide a squared periphery and a flat-beet-engaging tread portion 43 which is relatively broad in order to ride upon the beets in the row. Wheel 40 serves as a feeler gauge to determine the amount of crown to be severed from the beets in the row by the disks 29 and 30. The wheel 40 is driven in the direction indicated by the arrow in Figure 4 which is the direction of travel of the machine. A sleeve member 44 mounted upon the shaft 37 has secured thereto a strap 45 which extends forwardly and is connected to a depending strap member 46 secured to a sleeve 47 upon the shaft 39.

At the juncture of straps 45 and 46 is pivotally mounted a large sprocket wheel 48 and a small sprocket wheel 49. The large sprocket 48 has trained thereabout a chain 50 which is also drivingly connected to a sprocket 51 mounted on shaft 37. Sprocket wheel 49 is secured to sprocket 48 and is drivingly connected by a chain 52 to a sprocket 53 mounted upon the shaft 39 of the wheel 40. Drive is thus transmitted from the tractor power plant to simultaneously operate the disks 29 and 30 and the feeler gauge wheel 40. Each of the straps 45 and 46 comprises a pair of members having bolt and slot connections indicated at 54 by which the length of the straps 45 and 46 may be varied to adjust the position of the wheel 40 with respect to the cutting disks.

Further adjustment in the position of the gauge wheel 40 with respect to the cutting disks is provided by a rotatable adjusting rod 55 operated preferably manually by the tractor operator from his position, not shown, and connected at its forward end by a universal joint 56 to a threaded rod 57 passing through a threaded swivel 58 carried by a bracket 59 secured to the plate 14. The other end of rod 57 is anchored to the upper end of an arm 60 of a bell-crank 61 pivotally mounted at 62 upon the depending member 19. The lower end of the other arm 63 of the bell-crank is connected by a link 64 to the hood member 38.

It will be noted that by virtue of the mounting of the topping mechanism upon the tractor by parallel links 21, the unit is capable of floating movement and of being vertically moved between operating and transport positions with respect to the tractor. Raising and lowering of the topping mechanism is accomplished by mechanism including a rock arm 65 mounted upon the tractor and rocked by power derived therefrom. Rock arm 65 is connected by a rod 66 to a lift arm 67 mounted upon a pivot 68 carried by the tractor. Also secured to the pivot 68 is an arm 69 which is connected by a rod comprising a sleeve 70 and a telescoping shaft 71 with an arm 72 secured to the yoke 17. It will thus be clear that forward rocking of arm 65 also rocks arms 67 and 72 forwardly to raise the parallel links 18 and 21 and the topping mechanism carried thereby.

In Figure 4 is indicated the manner in which the feeler gauge 40 operates with respect to the beets in the row. In the solid line position of the wheel, it is travelling over a small beet and a larger beet is encountered in the dotted line position of the wheel. It is noted that in these two positions the wheel has maintained its same vertical position with respect to the ground. It will thus be observed that a greater amount of crown will be severed from the larger beet than from the smaller beet.

The invention has been described in its preferred embodiment and it should be understood that modifications may be made therein without departing from the spirit of the invention or the scope of the appended claims.

What is claimed is:

1. In topping mechanism for beets and the like adapted to be mounted upon a tractor for floating movement with respect thereto, a top-removing member connected to the tractor for vertical movement with respect thereto, a rotary feeler gauge mounted in advance of said member to engage the beets, said gauge having a pneumatic beet-contacting tire yieldable in proportion to the size of the beet.

2. In topping mechanism for beets and the like adapted to be mounted upon a vehicle, a cutting member for severing the crown from the beets, a support for the cutting member mounted on the vehicle for floating movement with respect thereto, and a rotary feeler gauge rigidly secured to the support for rotation in a vertical plane in advance of the cutting member and engageable with the beets to cause the topping mechanism to rise and fall with variations in size of the beets, said feeler gauge having a substantially inflexible rim portion and a beet-engaging tire portion of a flexible material adapted to yield to an extent proportionate to the size of the beet.

3. In topping mechanism for beets and the like adapted to be mounted upon a vehicle, a cutting member for severing the crown from the beets, a support for the cutting member mounted on the vehicle for floating movement with respect thereto during passage of the vehicle parallel to a plant row, and a pneumatic tired rotary feeler gauge rigidly secured to the support and arranged to engage the beets in advance of the cutting member to gauge the amount of crown to be removed by the cutting member, said pneumatic tired gauge being yieldable to an extent corresponding to the size of the beet to provide for severing from the beet a greater or lesser amount of crown.

4. In a topping mechanism for beets and the like adapted to be mounted upon a tractor, a cutting blade for severing the tops from the beets, means connecting the blade to the tractor for vertical movement relative thereto, a feeler gauge in the form of a wheel rotatably mounted and associated with said cutting blade for vertical movement therewith, said wheel being mounted in advance of and vertically above said blade to serve as a gauge therefor, and means for securing a differential in the thickness of crown cut from beets of different size comprising a yieldable tire on said wheel, said tire being yieldable in proportion to the size of the beet engaged thereby.

5. In a topping mechanism for beets and the like adapted to be mounted upon a tractor, a cutting blade for severing the tops from the beets, means connecting the blade to the tractor for vertical movement relative thereto, a feeler gauge in the form of a wheel rotatably mounted and associated with said cutting blade for vertical movement therewith, said wheel being mounted in advance of and vertically above said blade to serve as a gauge therefor, and means for securing a differential in the thickness of crown cut from beets of different size comprising a pneumatic tire on said wheel, said tire being yieldable in proportion to the size of the beet engaged thereby.

6. In a topping mechanism for beets and the like adapted to be mounted upon a tractor, a cutting blade for severing the tops from the beets, means connecting the blade to the tractor for vertical movement relative thereto, a feeler gauge in the form of a wheel rotatably mounted and associated with said cutting blade for vertical movement therewith, said wheel being mounted in advance of and vertically above said blade to serve as a gauge therefor, and means for securing a differential in the thickness of crown cut from beets of different size comprising a pneumatic tire on said wheel, said tire having a relatively broad flat peripheral surface adapted to travel upon the beets and being yieldable in proportion to the size of the beet engaged thereby.

JAMES MORKOSKI.

REFERENCES CITED

The following references are of record in the file of this patent:

UNITED STATES PATENTS

| Number | Name | Date |
|---|---|---|
| 951,476 | King | Mar. 8, 1910 |
| 1,351,287 | Devey | Aug. 31, 1920 |
| 2,337,698 | Walz | Dec. 28, 1943 |
| 2,340,919 | Allen | Feb. 8, 1944 |
| 2,492,962 | Bohmker et al. | Jan. 3, 1950 |
| 2,528,886 | Jones | Nov. 7, 1950 |